US012669033B2

(12) United States Patent (10) Patent No.: US 12,669,033 B2
Shepherd et al. (45) Date of Patent: Jun. 30, 2026

(54) ENCAPSULATED INTERNAL FILTER CAKE BREAKER

(71) Applicant: Baker Hughes Oilfield Operations LLC, Houston, TX (US)

(72) Inventors: Autumn Shepherd, Katy, TX (US); Dorianne A. Castillo, Humble, TX (US); Oleg Mazyar, Katy, TX (US); Rostyslav Dolog, Houston, TX (US); Radhika Suresh, Sugar Land, TX (US); Angela Doan, Spring, TX (US)

( * ) Notice: Subject to any disclaimer, the term of this patent is extended or adjusted under 35 U.S.C. 154(b) by 0 days.

(21) Appl. No.: 18/802,206

(22) Filed: Aug. 13, 2024

(65) Prior Publication Data

US 2025/0059854 A1     Feb. 20, 2025

Related U.S. Application Data

(60) Provisional application No. 63/532,548, filed on Aug. 14, 2023.

(51) Int. Cl.
| | |
|---|---|
| *E21B 37/06* | (2006.01) |
| *C09K 8/524* | (2006.01) |
| *C09K 8/528* | (2006.01) |
| *E21B 37/08* | (2006.01) |

(52) U.S. Cl.
CPC .............. *E21B 37/06* (2013.01); *C09K 8/524* (2013.01); *C09K 8/528* (2013.01); *E21B 37/08* (2013.01)

(58) Field of Classification Search
None
See application file for complete search history.

(56) References Cited

U.S. PATENT DOCUMENTS

| | | | |
|---|---|---|---|
| 4,036,301 | A | 7/1977 | Powers et al. |
| 4,269,279 | A | 5/1981 | House |
| 4,391,925 | A | 7/1983 | Mintz et al. |
| 4,614,599 | A | 9/1986 | Walker |
| 4,664,816 | A | 5/1987 | Walker |
| 5,102,559 | A | 4/1992 | McDougall et al. |
| 6,528,157 | B1 | 3/2003 | Hussain et al. |
| 6,581,701 | B2 | 6/2003 | Heying |
| 7,036,856 | B2 | 5/2006 | Fishencord |

(Continued)

FOREIGN PATENT DOCUMENTS

| | | |
|---|---|---|
| CN | 109517588 A | 3/2019 |
| CN | 110591676 A | 12/2019 |

(Continued)

OTHER PUBLICATIONS

Cabeza et al., "Evaluation of volume change in phase change materials during their phase transition"; Journal of Energy Storage 28 (2020); Jan. 14, 2020; 4 pages.

(Continued)

*Primary Examiner* — Andrew Sue-Ako
(74) *Attorney, Agent, or Firm* — Baker Hughes Company

(57) ABSTRACT

A method includes: introducing a breaker composite into a subsurface formation, the breaker composite having a shell encapsulating a core comprising a breaker; breaking or degrading the shell of the breaker composite to release the breaker; and reacting the released breaker with a component of a filter cake, a scale, or a combination thereof thereby removing the filter cake, the scale, or a combination thereof.

15 Claims, 4 Drawing Sheets

(56) References Cited

U.S. PATENT DOCUMENTS

| | | | |
|---|---|---|---|
| 7,343,985 B1 | 3/2008 | Gregg | |
| 7,559,369 B2 | 7/2009 | Roddy et al. | |
| 7,629,297 B2 | 12/2009 | Shaarpour | |
| 7,703,521 B2 | 4/2010 | Sullivan et al. | |
| 7,784,542 B2 | 8/2010 | Roddy et al. | |
| 7,784,566 B2 | 8/2010 | Gregg | |
| 7,806,183 B2 | 10/2010 | Roddy et al. | |
| 7,892,352 B2 | 2/2011 | Roddy et al. | |
| 8,574,667 B2 | 11/2013 | John et al. | |
| 8,586,512 B2 | 11/2013 | Roddy et al. | |
| 8,592,353 B2 | 11/2013 | Dalrymple et al. | |
| 8,598,093 B2 | 12/2013 | Roddy et al. | |
| 8,603,952 B2 | 12/2013 | Roddy et al. | |
| 8,689,869 B2 | 4/2014 | Shindgikar et al. | |
| 8,815,135 B2 | 8/2014 | Beecher et al. | |
| 9,090,812 B2 | 7/2015 | Gerrard et al. | |
| 9,206,344 B2 | 12/2015 | Roddy et al. | |
| 9,238,771 B1 | 1/2016 | Mahmoud | |
| 9,321,956 B2 | 4/2016 | Nguyen et al. | |
| 9,416,050 B2 | 8/2016 | Seidl et al. | |
| 9,546,315 B2 | 1/2017 | Pollard et al. | |
| 9,587,163 B2 | 3/2017 | Gaudette et al. | |
| 9,702,217 B2 | 7/2017 | Dolog et al. | |
| 9,765,252 B2 | 9/2017 | Roddy et al. | |
| 10,060,205 B2 | 8/2018 | De Stefano et al. | |
| 10,081,756 B1 | 9/2018 | Reddy et al. | |
| 10,160,896 B2 | 12/2018 | Weaver et al. | |
| 10,385,647 B2 | 8/2019 | Gozalo et al. | |
| 10,590,338 B2 | 3/2020 | Hall et al. | |
| 10,718,883 B2 | 7/2020 | Galliano et al. | |
| 11,008,839 B2 | 5/2021 | Collier et al. | |
| 12,258,821 B2 | 3/2025 | Dolog et al. | |
| 12,258,822 B2 | 3/2025 | Dolog et al. | |
| 2007/0032386 A1* | 2/2007 | Abad | C09K 8/508 507/201 |
| 2008/0087431 A1 | 4/2008 | Willauer et al. | |
| 2009/0084539 A1 | 4/2009 | Duan et al. | |
| 2009/0205833 A1* | 8/2009 | Bunnell | E21B 34/066 166/57 |
| 2010/0160189 A1* | 6/2010 | Fuller | C09K 8/508 507/239 |
| 2011/0042075 A1* | 2/2011 | Hammami | E21B 47/017 166/250.01 |
| 2011/0067872 A1 | 3/2011 | Agrawal | |
| 2011/0088901 A1 | 4/2011 | Watters et al. | |
| 2011/0252781 A1 | 10/2011 | Johnson et al. | |
| 2012/0175118 A1 | 7/2012 | Khatri et al. | |
| 2012/0190593 A1 | 7/2012 | Soane et al. | |
| 2012/0208726 A1 | 8/2012 | Smith et al. | |
| 2013/0126164 A1 | 5/2013 | Sweatman et al. | |
| 2013/0146312 A1 | 6/2013 | Gerrard et al. | |
| 2014/0262529 A1 | 9/2014 | Quintero et al. | |
| 2014/0345878 A1 | 11/2014 | Murphree et al. | |
| 2015/0047841 A1* | 2/2015 | Mazyar | E21B 43/12 166/276 |
| 2015/0060072 A1 | 3/2015 | Busby et al. | |
| 2015/0159079 A1* | 6/2015 | Huh | E21B 43/16 166/248 |
| 2015/0240609 A1 | 8/2015 | Lucas et al. | |
| 2016/0186044 A1* | 6/2016 | Rothrock | C09K 8/70 507/236 |
| 2016/0312098 A1 | 10/2016 | Savari et al. | |
| 2016/0326829 A1 | 11/2016 | Dolog et al. | |
| 2017/0002257 A1 | 1/2017 | Pisklak et al. | |
| 2017/0015824 A1 | 1/2017 | Gozalo et al. | |
| 2017/0240804 A1* | 8/2017 | Tellez | C09K 8/38 |
| 2017/0356269 A1* | 12/2017 | Denton | E21B 33/1208 |
| 2018/0037803 A1 | 2/2018 | Dahi Taleghani et al. | |
| 2018/0149008 A1 | 5/2018 | Nguyen et al. | |
| 2018/0223180 A1* | 8/2018 | Hall | C09K 8/68 |
| 2018/0237680 A1* | 8/2018 | Hall | C09K 8/72 |
| 2018/0258340 A1 | 9/2018 | Rothrock et al. | |
| 2019/0031951 A1* | 1/2019 | Johnson | C09K 8/70 |
| 2019/0375978 A1 | 12/2019 | Shojaei et al. | |
| 2020/0181475 A1 | 6/2020 | Dighe et al. | |
| 2020/0299202 A1* | 9/2020 | Choi | C04B 20/1074 |
| 2020/0354622 A1 | 11/2020 | Sherman et al. | |
| 2020/0362220 A1 | 11/2020 | Musso et al. | |
| 2021/0172303 A1 | 6/2021 | Musso et al. | |
| 2023/0167721 A1 | 6/2023 | Palisch et al. | |
| 2023/0340854 A1 | 10/2023 | Fripp et al. | |
| 2025/0059428 A1 | 2/2025 | Suresh et al. | |
| 2025/0059429 A1 | 2/2025 | Suresh et al. | |
| 2025/0059436 A1 | 2/2025 | Mazyar et al. | |
| 2025/0059837 A1 | 2/2025 | Dolog et al. | |
| 2025/0059838 A1 | 2/2025 | Dolog et al. | |

FOREIGN PATENT DOCUMENTS

| | | |
|---|---|---|
| CN | 111303847 A | 6/2020 |
| KR | 20190036399 A | 4/2019 |
| WO | 03044317 A1 | 5/2003 |
| WO | 2009106796 A1 | 9/2009 |
| WO | 2014092888 A1 | 6/2014 |

OTHER PUBLICATIONS

Da Cunha et al., "Thermal energy storage for low and medium temperature applications using phase change materials—A review"; Applied Energy 177 (2016); May 24, 2016; 12 pages.

Farley et al., "Field Test of a Self-Conforming Oil Recovery Fluid"; Journal of Petroleum Technology; Nov. 1, 1976; 7 pages.

Frampton, et al., "Development of a Novel Waterflood Conformance Control System"; SPE/DOE Symposium, Tulsa OK, Apr. 2004; Paper No. SPE-89391-MS; 7 pages.

Garmeh et al., "Thermally Active Polymer to Improve Sweep Efficiency of Waterfloods: Simulation and Pilot Design Approaches"; SPE Paper No. 144234; Jul. 19, 2011; 13 pages.

Himes, et al., Reversible, Crosslinkable Polymer for Fluid-Loss Control; Society of Petroleum Engineers, SPE Paper No. 27373; Feb. 7, 1994; 2 pages.

International Search Report and Written Opinion for International Application No. PCT/US2024/041891, International Filing Date Aug. 12, 2024, Date of Mailing Nov. 27, 2024, 10 pages.

International Search Report and Written Opinion for International Application No. PCT/US2024/041892, International Filing Date Aug. 12, 2024, Date of Mailing Nov. 22, 2024, 9 pages.

International Search Report and Written Opinion for International Application No. PCT/US2024/041894, International Filing Date Aug. 12, 2024, Date of Mailing Nov. 26, 2024, 12 pages.

Jankowski et al., "A review of phase change materials for vehicle component thermal buffering"; Applied Energy 113 (2014); Oct. 4, 2013; 37 pages.

Kahar et al., "The Versatility of Polymeric Materials as Self-Healing Agents for Various Types of Applications: A Review"; Polymers 2021, 13, 1194; 34 pages.

Kenisarin, "High-temperature phase change materials for thermal energy storage"; Renewable and Sustainable Energy Reviews 14 (2010); Oct. 28, 2009; 16 pages.

Korojy, "Volume Change Effects during Solidification of Alloys"; Royal Institute of Technology; Doctoral Thesis; Jun. 2009; 58 pages.

Li, et al., "Study of solid-solid phase change . . . "; Thermochimica Acta 326 (1999); 4 pages.

Maffeis et al., Application of Thermally Activated Polymers in a Mature Oil Field: Candidates Selection, Field Implementation and Preliminary Results: Offshore Mediterranean Conference; Mar. 2017; 6 pages.

Magzoub, M. et al. "Loss Circulation Prevention in Geothermal Drilling by Shape Memory Polymer" Elsevier, Geothermics, vol. 89, Jan. 2021, 101943, 7 pages.

Mansour, Ahmed et al., "Smart Expandable LCMs—A Theoretical and Experimental Study;" American Association of Drilling Engineers; Apr. 11, 2017; 7 pages.

Mansour, Ahmed et al., "Smart lost circulation materials for productive zones;" Journal of Petroleum Exploration and Production Technology; May 2, 2018; 16 pages.

(56)            References Cited

OTHER PUBLICATIONS

Notification of Transmittal of the International Search Report and the Written Opinion of the International Searching Authority, or the Declaration; PCT/US2024/041898; Mail date Nov. 19, 2024; 10 pages (PPS0127).

Peng, et al.; "Phase Change Material (PCM) Microcapsules for Thermal Energy Storage"; Advances in Polymer Technology; vol. 2020, Article ID 9490873; 20 pages; Jan. 12, 2020.

Pereira et al., "Polymers as Encapsulating Agents and Delivery Vehicles of Enzymes"; Polymers 2021, 13, 4061; Nov. 21, 2021; 28 pages.

Rogers et al., "New Equipment Designs Enable Swellable Technology in Cementless Completions"; IADC/SPE Drilling Conference; Mar. 4, 2008.

Savari et al., "Lost Circulation Management in Naturally Fractured Formations: Efficient Operational Strategies and Novel Solutions": IADC/SPE Drilling Conference and Exhibition; Mar. 1, 2016.

Savari et al., "Lost Circulation Management in Naturally Fractured Reservoirs"; SPE/IADC Middle East; Jan. 2016; 6 pages.

Zhong et al., "Mitigation of Lost Circulation in Oil-Based Drilling Fluids Using Oil Absorbent Polymers;" Materials; Oct. 18, 2019; 20 pages.

* cited by examiner

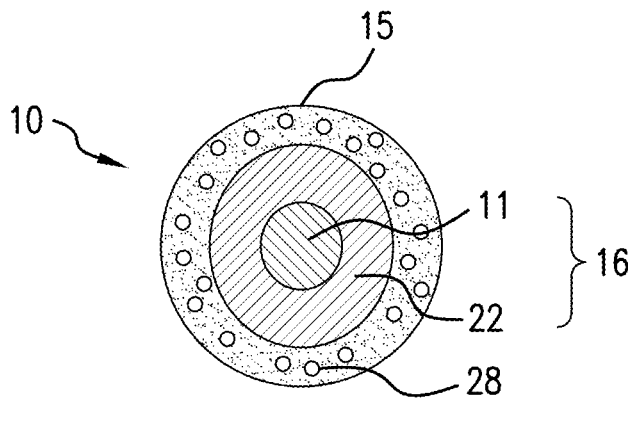
FIG.5
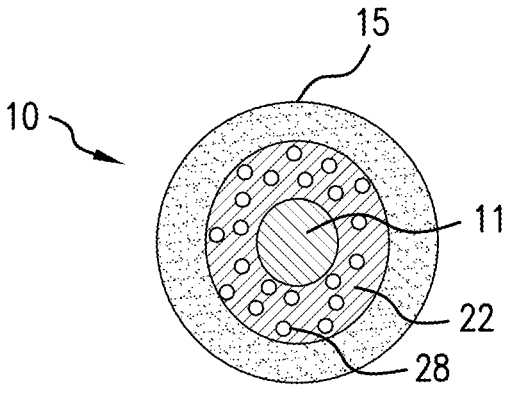
FIG.6
FIG.7

ENCAPSULATED INTERNAL FILTER CAKE BREAKER

CROSS REFERENCE TO RELATED APPLICATIONS

This application claims the benefit of an earlier filing date from U.S. Provisional Application Ser. No. 63/532,548, filed Aug. 14, 2023, the entire disclosure of which is incorporated herein by reference.

BACKGROUND

The disclosure is directed to internal filter cake breakers and the on-demand triggered release of the filter cake breakers.

A filter cake is the residue deposited adjacent to a subsurface formation, when a slurry, such as a drilling fluid or a servicing fluid, is forced against a wellbore or subsurface formation under pressure. If a filter cake is not removed prior to or during completion of the well, a range of issues, such as completion equipment failures or impaired reservoir productivity, can arise when the well is put on production. Thus, methods that can efficiently remove filter cake will be appreciated in the industry.

SUMMARY

A method includes: introducing a breaker composite into a subsurface formation, the breaker composite having a shell encapsulating a core comprising a breaker; breaking or degrading the shell of the breaker composite to release the breaker; and reacting the released breaker with a component of a filter cake, a scale, or a combination thereof thereby removing the filter cake, the scale, or a combination thereof.

A drilling fluid includes: a carrier; a breaker composite having a shell encapsulating a core comprising a breaker; and at least one of a viscosifier, a rheology modifier, a dispersant, a weighting agent, a defoamer, a fluid loss agent, a thickening agent, bentonite, a lubricant, a filler, an emulsifier, a surfactant, or a pH buffer; wherein the breaker comprises at least one of an acid component or a chelant.

BRIEF DESCRIPTION OF THE DRAWINGS

The following descriptions should not be considered limiting in any way. With reference to the accompanying drawings, like elements are numbered alike:

FIG. 5 illustrates a breaker composite comprising a magnetic material disposed in a shell of the breaker composite;

FIG. 6 illustrates a breaker composite comprising a magnetic material disposed in an outer core of a disintegrating agent;

FIG. 7 illustrates a breaker composite having a shell, an inner core of a breaker, and a disintegrating agent and a magnetic material disposed in a matrix between the inner core and the shell.

DETAILED DESCRIPTION

Figure 1:
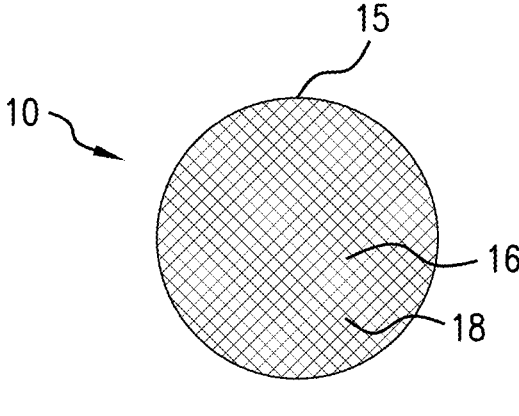
FIG. 1 illustrates a breaker composite having a degradable shell encapsulating a core comprising a breaker.

Described are methods of removing a filter cake, a scale, or a combination thereof using a breaker composite having a shell protecting a breaker encapsulated in the shell. The breaker composite can have a degradable shell, which can be degraded by a wellbore fluid thus releasing the breaker. Alternatively, the breaker composite can have a non-degradable shell, and in this instance, the breaker composite further includes a disintegrating agent capable of exerting pressure on the shell from within the breaker composite when triggered thereby breaking the shell and releasing the breaker. The disintegrating agent can also be used when the shell is degradable.

By using a protective shell, the activity of the breaker is preserved for the intended application. In addition, loss due to adsorption is prevented. Moreover, the breaker can be released when needed since the degradation or disintegration of the shell can be triggered on demand.

The breaker can comprise at least an acid component or a chelant. The acid component can include an acid, an acid precursor, or a combination thereof. The acids can be an inorganic acids such as HCl, $H_2SO_4$, HF, $HNO_3$; binary acids or carboxylic acids such as acetic acid, formic acid, lactic acid, citric acid, phthalic acid; or amino acids such as glutamic acid. Acid precursors include esters of acetic acid, formic acid, lactic acid, or citric acid. Combinations of the acids and/or acid precursors can be used. As used herein, the acid component refers to an acid or acid precursor that does not form coordinate bonds with a metal.

Examples of the chelant include ethylenediaminetetraacetic acid (EDTA) or a salt thereof such as sodium EDTA and disodium EDTA, trisodium N-(hydroxyethyl)-ethylenediaminetriacetate, pentasodium diethylene-triaminepentaacetate, (N,N, dicarboxymethyl glutamic) acid (GLDA), aspartic acid N,N-diacetic acid (ASDA), methylglycine N,N-diacetic acid (MGDA), N-hydroxyethyl ethylenediamine N,N',N'-triacetic acid or a salt thereof (HEDTA), etidronic acid (also referred to has 1-hydroxyethane-1,1-diphosphonic acid HEDP), or diethylenetriamine pentaacetateor (DTPA), hydroxyethylethylenediaminetriacetic acid (HEDTA), N-(2-Hydroxyethyl)iminodiacetic acid (HEIDA), trisodium dicarboxymethyl alaninate (MGDA), ethylenediamine-N, N'-disuccinic acid (EDDS), egtazic acid (EGTA), nitrilotriacetic acid (NTA), cyclohexanediaminetetraacetic acid (CDTA), or a salt of the acids. The breaker can include more than one acid component and/or more than one chelant.

Optionally the breaker may be absorbed into a porous structure, and the porous structure with the breaker together can be encapsulated by the shell. Examples of the porous structure include zeolites, clays, mesoporous nanoparticles, covalent organic frameworks, metal organic frameworks, porous boron nitride, porous metal oxide nanoparticles, porous carbon based nanoparticles, ceramics, aerogels, etc. The presence of the porous structure can further delay the release of the breaker once the shell is broken.

The shell of the breaker composite can comprise a degradable material. The material for the degradable shell can include a polymer, a metallic material, or a composite. The metallic material can comprise at least one of Zn, Mg, Al, Mn, or an alloy thereof. The metallic material can further comprise at least one of Ni, W, Mo, Cu, Fe, Cr, Co, or an alloy thereof.

The degradable shell can comprise degradable polymers and their composites including poly(lactic acid) (PLA), poly(glycolic acid) (PGA), polycaprolactone (PCL), poly-lactide-co-glycolide, polyurethane such as polyurethane having ester or ether linkages, polyvinyl acetate, polyesters. The degradable shell can include more than one degradable polymer.

The shell can also be non-degradable. The shell of the composite can include natural polymers such as alginate, cellulose, starch, chitosan, dextran sulfate, pectin, or xanthan gum; or synthetic polymers such as polymethacrylate, polydimethylsiloxane, polystyrene, polyvinyl acetate, or polyvinylpyrrolidone. The shell can also include inorganic materials such as silica, alumina, titania, sodium silicate, or calcium carbonate; metallic materials such as nickel, nickel phosphorus, or nickel alloys; iron oxides such as magnetite, maghemite, and haematite; oxyhydroxides such as goethite, ferrihydrite, and lepidocrocite; iron salts such as iron carbonates, iron sulfides, and iron carbides; or a combination thereof.

The thickness of the shell can be about 5 μm to about 1000 μm or about 10 μm to about 100 μm.

The breaker composite can optionally include a disintegrating agent, where the disintegrating agent comprises at least one of a phase change material (PCM) or a gas-producing material. As used herein, a PCM is a substance that can have a volumetric expansion at phase transition. Preferably, the PCM used in the composite of the disclosure can have a volumetric expansion of at least 3 vol %, at least 5 vol %, or at least 10 vol % during phase transition, each based on the initial volume of the PCM before expansion or before phase transition. The phase transition temperature of the PCM can be between about 125° F. (52° C.) and about 1000° F. (538° C.), more specifically between about 125° F. (52° C.) and about 700° F. (371° C.). PCMs with transition temperatures between about 500° F. (260° C.) and about 1000° F. (538° C.) can be activated by applying short term localized magnetic heating that would not negatively affect core matrix material and/or encapsulated breaker. Furthermore, a magnetic material that provides heating electromagnetic energy can be coated on a PCM to further localize heat inside a composite to regions with PCM.

The PCM can be a variety of different material classes, including inorganic materials such as salts, salt hydrates, metal hydroxides, hydrates of metal hydroxides, metallic compounds, or metal alloys; organic materials such as paraffins, fatty acids, esters, or alcohols; or eutectic materials such as inorganic-inorganic eutectic materials, inorganic-organic eutectic materials, or organic-organic eutectic materials.

Inorganic salts, hydroxides, and their eutectic mixtures can be salts or hydroxides of I, II, III, IV groups such as halides, nitrates, carbonates, nitrites, sulfates, sulfites, hydroxides, or eutectic mixtures of thereof. Preferably, the PCM is a nitrite, halide, or hydroxide of metals of groups I and II, or eutectic mixtures of thereof. Some of the inorganic salts can also make eutectic mixtures with organic materials.

Specific examples of the inorganic salts, and their eutectic mixtures include $KNO_3$, $KNO_3$—$NaNO_3$, $Li_2CO_3$—$K_2CO_3$, LiF—NaF—KF—$MgF_2$, LiF—NaF—KF, LiF—KF, $LiKCO_3$, $LiNO_3$, $LiNO_3$—$NaNO_3$, $NaNO_2$, or $NaNO_3$.

Examples of an organic PCM include paraffins such as RT-58, high density polyethylene (HDPE), d-mannitol, hydroquinone, adipic acid, urea, acetamide, erythritol, phthalic anhydride, maleic acid, 2-chlorobenzoic acid, sugars, sugar alcohols, or fatty acids or their derivatives.

Paraffins with chain length of greater than 25 ($C_nH_{2n+2}$, with n>25) have melting points over 125° F. and typically exhibit volumetric expansion of >10%, usually ~15% or even more and can be a preferred PCM for the disclosed composite. Paraffin with n=100 (Hectane) for example has a melting temperature of 115° C. or 239° F. Accordingly, depending on the specific application and the desired phase transition temperature, a paraffin with a corresponding chain length can be selected.

A PCM with 10-15% volumetric change can include sugars or sugar alcohols. Examples of a sugar or sugar alcohol PCM include glycerol, xylitol, sorbitol, erythritol, glucose, fructose, isomalt, maltitol, lactitol, xylose-D, xylose-L, d-mannitol, or galactitol.

A PCM can also include hydrates of inorganic salts or metal hydroxides. These materials can break the shell by exerting pressure on the shell in two unique ways. Like other PCMs, hydrates of inorganic salts or metal hydroxides can expand in volume during PCM phase transition. Unlike other PCMs, hydrates of inorganic salts or metal hydroxides can also release water, which can generate additional pressure on the shell when water transitions to vapor if heated above its boiling point. Examples of the hydrate PCM include barium hydroxide octahydrate, magnesium nitrate hexahydrate, or magnesium chloride hexahydrate. Other examples may include hydrates of salts of I, II, III, IV groups that are halides, nitrates, carbonates, nitrites, sulfates, sulfites, or eutectic mixtures of thereof.

The disintegrating agent can also include compounds that do not expand during phase transition but can undergo thermal decomposition and produce gas molecules leading to a volume expansion. The gas-producing compound can include at least one of an azo compound, an azide compound, or a metal carbonyl. Azo compounds can release nitrogen upon heating, and can be used as a disintegrating agent in the disclosed composite. Examples of azo compounds include azobisisobutyronitrile (AIBN). Organic azide is an organic compound that contains an azide (—$N_3$) functional group. Sodium azide is the inorganic compound with the formula $NaN_3$.

Metal carbonyls are volatile and low-melting compounds of the $M_x(CO)_y$ type that decompose on heating into carbon monoxide and metal. Examples of metal carbonyls include $V(CO)_6$, $Cr(CO)_3$, $Mo(CO)_6$, $W(CO)_6$, $Mn_2(CO)_{10}$, $Tc_2(CO)_{10}$, $Fe(CO)_6$, $Os(CO)_5$, $Os_3(CO)_{12}$, $Rh_2(CO)_8$, [Rh(CO)_3]_x, $Rh_6(CO)_{15}$, $Ir_2(CO)_8$, $Ni(CO)_4$, or $[Pt(CO)_2]_x$.

The breaker composite can comprise about 1 to about 60 wt % or about 5 to about 40 wt % of the breaker, and about 0 to about 25 wt %, about 1 to about 25 wt % or about 5 to about 15 wt % of the disintegrating agent, each based on a total weight of the breaker composite.

The breaker can be combined with the optional disintegrating agent and encapsulated within a solid shell. The geometric arrangements of the breaker and the disintegrating agent are not particularly limited. The breaker can form an inner core while the disintegrating agent can form an outer core disposed between the inner core and the shell. Alternatively, the disintegrating agent can form an inner core, and the breaker can form an outer core disposed between the inner core and the shell. In another aspect, the breaker and the disintegrating agent can be randomly distributed in a core encapsulated by a shell.

FIG. 1 illustrates a breaker composite (10) having a shell (15) encapsulating a core (16) comprising a breaker (18).

Figure 2:
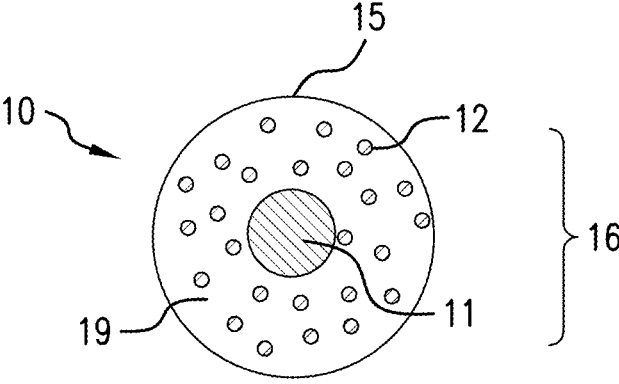
FIG. 2 illustrates a breaker composite having a shell, an inner core of a breaker, and a disintegrating agent disposed in a matrix between the inner core and the shell.
Figures 3, 4:
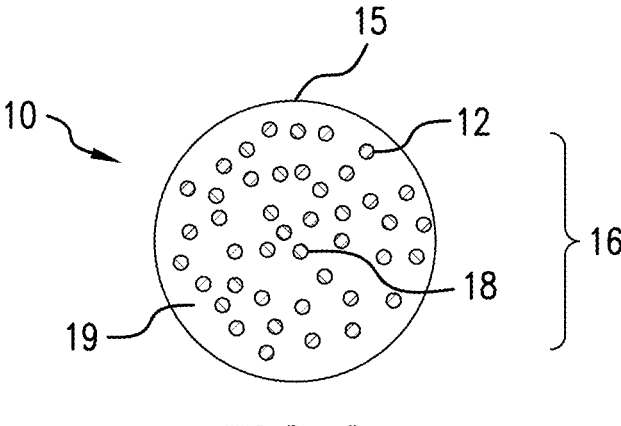
FIG. 3 illustrates a breaker composite having a shell encapsulating a breaker and a disintegrating agent disposed in a matrix.
FIG. 4 illustrates a breaker composite having a shell encapsulating a core, where the core has an inner core of a breaker, and an outer core of a disintegrating agent disposed between the inner core and the shell.

The breaker composite can also include a disintegrating agent as illustrated in FIGS. 2-4. As shown in FIG. 2, the disintegrating agent (12) can be disposed in a matrix (19) between an inner core (11) of a breaker and the shell (15). FIG. 3 illustrates a breaker composite (10) where the core (16) includes a breaker (18) and a disintegrating agent (12) disposed in a matrix (19) encapsulated in the shell (15). FIG. 4 illustrates a breaker composite (10) where the core (16) has an inner core (11) of a breaker, and an outer core (22) of a disintegrating agent disposed between the inner core (11) and the shell (15).

As used herein, the matrix is incompressible so that the matrix does not absorb the pressure or force generated by the disintegrating agent upon activation. The matrix can include a matrix material such as organic solvents, water, ionic liquids, crude oils, or mineral oils. A matrix can include more than one matrix material.

The composite can further comprise a magnetic material. Suitable magnetic materials can include a paramagnetic material, a superparamagnetic material, or a ferromagnetic material. The magnetic material can be part of the core containing the breaker and the optional disintegrating agent. The magnetic material can also be include in the shell of the composite. Illustratively the magnetic material can include iron; nickel; cobalt; ferrite; iron oxides such as magnetite, maghemite, and haematite; oxyhydroxides such as goethite, ferrihydrite, and lepidocrocite; and sulphides such as greigite and pyrrhotite; other iron salts such as iron carbonates, iron sulfides, and iron carbides; or a combination thereof. If present, the breaker composite can comprise about 0.01 to about 5 wt %, about 0.05 to about 0.5 wt %, or about 0.1 to about 0.2 wt % of a magnetic material, each based on a total weight of the breaker composite.

FIG. 5 illustrates a breaker composite (10) comprising a magnetic material (28) included in a shell (15) of the composite. The composite comprises a core (16), which includes an inner core (11) of a breaker, and an outer core (22) of a disintegrating agent disposed between the inner core (11) and the shell (15).

FIG. 6 illustrates a breaker composite (10) comprising a magnetic material (28) disposed in an outer core (22) of a disintegrating agent between an inner core (11) of a breaker and a shell (15).

FIG. 7 illustrates a breaker composite (10) comprising a magnetic material (28) and a disintegrating agent (12) disposed in a matrix (19) between an inner core (11) of a breaker and a shell (15).

Figure 8:
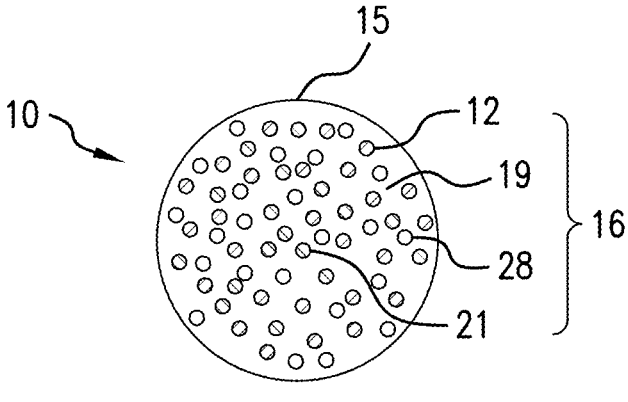
FIG. 8 illustrates a breaker composite having a shell encapsulating a breaker, a disintegrating agent, and a magnetic material disposed in a matrix encapsulated by a shell.

FIG. 8 illustrates a breaker composite (10) comprising a shell (15) encapsulating a breaker (21), a disintegrating agent (12), and a magnetic material (28) disposed in a matrix (19).

The composite can be present in the form of particles, for example particles having a size from about 0.01 to about 5000 μm, specifically about 0.05 to about 1000 μm, and more specifically about 0.1 to about 500 μm. Further, the composite particles can have any shape including spherical, angular, and polyhedral and are monodisperse or polydisperse with an average particle size distribution that is unimodal or multimodal, e.g., bimodal. As used herein the size of the particles refers to D50 particle size. A D50 particle size can be measured using a laser particle size distribution meter. A D50 particle size refers to a particle diameter corresponding to 50% of the particles by number in a cumulative distribution curve in which particles are accumulated in the order of particle diameter from the smallest particle to the largest particle, and a total number of accumulated particles is 100%.

The breaker composite as described herein can be manufactured via methods such as physical methods, chemical methods, or physical-chemical methods, for example, those methods as described in Advances in Polymer Technology Volume 2020, Article ID 9490873.

In physical methods, the formation of the shell only involves physical processes such as drying, dehydration, and adhesion. Examples of physical methods for encapsulating the breaker and the optional disintegrating agent include spray-drying and solvent evaporation. In a spray-drying method, an oil-water emulsion containing the breaker, the optional disintegration agent, the optional magnetic material, the optional matrix material, and the shell material can be sprayed in a drying chamber by using an atomizer, drying the sprayed droplets through drying gas stream, and separating the solid particles by cyclone and filter. In a solvent evaporation method, the breaker, the optional disintegrating agent, the optional magnetic material, and the optional matrix material can be added to a polymer solution containing the shell material dissolved in a volatile solvent to form an emulsion, and the shell can be formed on the droplets by evaporating the solvent. The composite can then be formed through filtration and drying.

Chemical microencapsulation methods utilize polymerization or a condensation process of monomers, oligomers, or prepolymers as raw materials to form shells at an oil-water interface. For example, individual components, e.g., the breaker, the optional disintegrating agent, the optional magnetic material, the optional matrix material, and the resin material (e.g., monomers and/or oligomers used to form a shell) can be combined in a vessel or reactor to form a reaction mixture, and then agitated to mix components. The reaction mixture can be heated at a temperature or at a pressure commensurate with forming the shell.

Hydrolysis and subsequent condensation can also be used to form inorganic shells. For example, alkoxysilanes or metal oxides can undergo hydrolysis then condensation to form a shell of silica, alumina or titania.

The breaker composite can be introduced into the subsurface formation through a treatment fluid during a downhole operation such as a drilling operation, or a remedial operation. Preferably, the treatment fluid is a drilling fluid.

As used herein, a drilling fluid includes a drill-in fluid, as the drill-in fluid is a type of drilling fluid designated especially for drilling through the reservoir section of a wellbore. The drilling fluid can be a water or brine-based drilling fluid, an oil or synthetic oil-based drilling fluid, or an invert emulsion based drilling fluid, which has a polar fluid such as water or brine emulsified as the internal phase with a non-polar fluid (oil) as the continuous phase. Other know types of drilling fluids can also be used.

The drilling fluid can contain a breaker composite as described herein; a carrier comprising at least one of water, brine, or an oil; and various additives comprising at least one of viscosifier, a rheology modifier, a dispersant, an emulsifier, a weighting agent, a defoamer, a fluid loss agent, a thickening agent, bentonite, a lubricant, a filler, a surfactant, or a pH buffer. For example, thickening agents like xanthan gum and other polysaccharides and emulsifiers can be included in the drilling fluid to aid in the suspension of drill cuttings. Sized particles that cover a particular range and distribution can be included in the drilling fluid to minimize the fluid loss with the formation of a filter cake. The drilling fluid can also include fillers such as starch and clays to fill the void spaces within the sized particles.

The drilling fluid can have a density of about 8.5 lb/gal to about 20 lb/gal, preferably about 10 lb/gal to about 18 lb/gal, more preferably about 12 lb/gal to about 18 lb/gal.

The treatment fluid such as the drilling fluid can be injected, e.g., pumped and placed by various conventional pumps and tools to any desired location within the wellbore. A filter cake can be formed from the treatment fluid adjacent a subsurface formation, for example, within a borehole, on a borehole wall, on a surface of a subsurface formation, or within a subsurface formation. Scale can also form adjacent the subsurface formation, for example, scale can be formed, or migrate into formation pores.

The filter cake can include the breaker composite. After the drilling operation, the breaker composite can be activated to release the breaker. The released breaker then can react with a component in the filter cake, scale, or a combination thereof thus removing the filter cake and/or the scale. The component in the filter cake or the scale that reacts with the breaker can be a calcium salt such as calcium carbonate.

The method to activate the breaker composite or to trigger the release of the breaker can include changing a pH of a wellbore fluid that contacts the breaker composite when the shell comprises a degradable material as described herein, and degrading the shell with the wellbore fluid. When the breaker composite comprises the disintegrating agent, breaking the shell can include raising the ambient temperature with the heat from the formation itself and/or using hot liquid, or steam. When the ambient temperature achieves the phase transition temperature for the PCM, the PCM expands exerting pressure on the shell until it breaks thus releasing the breaker. In the event that the disintegrating agent comprises a gas-producing material, the temperature increase can cause the gas-producing material to decompose, producing a gas to break the shell.

The integrity of the shell can also be compromised by ultrasound, chemical degradation, or dissolution in combination with the temperature increase. For the composite that contains a magnetic material, the temperature of the composite can be increased by exposing the magnetic material to a thermomagnetic radiation, for example by inducing Eddy current in it, and/or by magnetic induction heating or via a process known as Neel relaxation through the application of the oscillating electromagnetic field on the composites. The heat produced by the magnetic material can cause the PCM to expand and/or to cause the gas-producing material to generate a gas, thus breaking the shell and releasing the breaker. The released breaker helps to remove the filter cake, the scale, or a combination thereof thus cleaning up the formation, reducing formation damage, and increasing production.

Set forth below are various aspects of the disclosure.

Aspect 1. A method comprising: introducing a breaker composite into a subsurface formation, the breaker composite having a shell encapsulating a core comprising a breaker; breaking or degrading the shell of the breaker composite to release the breaker; and reacting the released breaker with a component of a filter cake, a scale, or a combination thereof thereby removing the filter cake, the scale, or a combination thereof.

Aspect 2. The method as in any prior aspect, further comprising: forming the filter cake adjacent the subsurface formation from a treatment fluid, the filter cake comprising the breaker composite.

Aspect 3. The method as in any prior aspect, wherein the treatment fluid is a drilling fluid.

Aspect 4. The method as in any prior aspect, wherein the breaker comprises at least one of an acid component or a chelant.

Aspect 5. The method as in any prior aspect, wherein the component in the filter cake or the scale that reacts with the released breaker is a calcium salt.

Aspect 6. The method as in any prior aspect, wherein the shell comprises a degradable material.

Aspect 7. The method as in any prior aspect, wherein degrading the shell comprises changing a pH of a wellbore fluid contacting the breaker composite, and degrading the shell with the wellbore fluid.

Aspect 8. The method as in any prior aspect, wherein the core of the breaker composite further comprises a disintegrating agent comprising at least one of a phase change material or a gas-producing material.

Aspect 9. The method as in any prior aspect, wherein breaking the shell comprises heating the disintegrating agent to cause the phase change material to expand, or to cause the gas-producing material to produce a gas, or a combination thereof.

Aspect 10. The method as in any prior aspect, wherein the core comprises the phase change material, the phase change material having a phase transition temperature of about 125° F. (52° C.) and about 1,000° F. (538° C.); and a volumetric expansion of at least 3% during a phase transition relative to a volume of the phase change material before the phase transition.

Aspect 11. The method as in any prior aspect, wherein the core comprises the phase change material, and the phase change material comprises at least one of an inorganic salt, an eutectic mixture of inorganic salts, a metal hydroxide, an eutectic mixture of an inorganic salt with an organic material, a hydrate of an inorganic salt, a hydrate of metal hydroxide, or an organic material.

Aspect 12. The method as in any prior aspect, wherein the core comprises the gas-producing material, and the gas-producing material comprises at least one of an azo compound, an azide compound, or a metal carbonyl.

Aspect 13. The method as in any prior aspect, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

Aspect 14. The method as in any prior aspect, wherein the breaker composite further comprises a magnetic material.

Aspect 15. The method as in any prior aspect, wherein the method further comprises applying an electromagnetic radiation to the magnetic material to generate heat.

Aspect 16. The method as in any prior aspect, comprising: injecting into the subsurface formation a drilling fluid comprising a carrier, the breaker composite, and at least one of a viscosifier, a rheology modifier, a dispersant, a weighting agent, a defoamer, a fluid loss agent, a thickening agent, bentonite, a lubricant, a filler, a surfactant, an emulsifier, or a pH buffer; forming a filter cake adjacent the subsurface formation from the drilling fluid, the filter cake comprising the breaker composite; performing a wellbore operation; breaking or degrading the shell of the breaker composite to release the breaker; and reacting the released breaker with a calcium salt in the filter cake thereby removing the filter cake, wherein the breaker comprises at least one of an acid component or a chelant.

Aspect 17. A drilling fluid comprising: a carrier; a breaker composite having a shell encapsulating a core comprising a breaker; and at least one of a viscosifier, a rheology modifier, a dispersant, a weighting agent, a defoamer, a fluid loss agent, a thickening agent, bentonite, a lubricant, a filler, an emulsifier, a surfactant, or a pH buffer; wherein the breaker comprises at least one of an acid component or a chelant.

Aspect 18. The drilling fluid as in any prior aspect, wherein the core further comprises a disintegrating agent comprising at least one of the phase change material or a gas-producing material.

Aspect 19. The drilling fluid as in any prior aspect, wherein the breaker composite further comprises a magnetic material.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). The term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments/aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method comprising:
introducing a breaker composite into a subsurface formation, the breaker composite having a shell encapsulating a core comprising a breaker, wherein the breaker comprises at least one of an acid component or a chelant, and wherein the core comprising a disintegrating agent comprising a phase change material, wherein the phase change material comprises paraffines, high density polyethylene (HDPE), d-mannitol, hydroquinone, adipic acid, acetamide, erythritol, phthalic anhydride, maleic acid, 2-chlorobenzoic acid, sugars, sugar alcohols, or fatty acids or their derivatives;
breaking or degrading the shell of the breaker composite to release the breaker, wherein breaking or degrading the shell comprises heating the disintegrating agent to cause the phase change material to expand; and
reacting the released breaker with a component of a filter cake, a scale, or a combination thereof thereby removing the filter cake, the scale, or a combination thereof.

2. The method of claim 1, further comprising:
forming the filter cake adjacent the subsurface formation from a treatment fluid, the filter cake comprising the breaker composite.

3. The method of claim 1, wherein the treatment fluid is a drilling fluid.

4. The method of claim 1, wherein the component in the filter cake or the scale that reacts with the released breaker is a calcium salt.

5. The method of claim 1, wherein the shell comprises a degradable material.

6. The method of claim 5, wherein degrading the shell further comprises changing a pH of a wellbore fluid contacting the breaker composite, and degrading the shell with the wellbore fluid.

7. The method of claim 1, wherein the disintegrating agent further comprising a gas-producing material.

8. The method of claim 7, wherein breaking the shell comprises heating the disintegrating agent to cause the gas-producing material to produce a gas.

9. The method of claim 7, wherein the core comprises the phase change material, the phase change material having a phase transition temperature between about 125° F. (52° C.) and about 1,000° F. (538° C.); and a volumetric expansion of at least 3% during a phase transition relative to a volume of the phase change material before the phase transition.

10. The method of claim 1, wherein the phase change material further comprises at least one of an inorganic salt, an eutectic mixture of inorganic salts, a metal hydroxide, an eutectic mixture of an inorganic salt with an organic material, a hydrate of an inorganic salt, a hydrate of metal hydroxide, or an organic material.

11. The method of claim 7, wherein the gas-producing material comprises at least one of an azo compound, an azide compound, or a metal carbonyl.

12. The method of claim 7, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

13. The method of claim 1, wherein the breaker composite further comprises a magnetic material.

14. The method of claim 13, wherein the method further comprises applying an electromagnetic radiation to the magnetic material to generate heat.

15. The method of claim 1, comprising:
injecting into the subsurface formation a drilling fluid comprising a carrier, the breaker composite, and at least one of a viscosifier, a rheology modifier, a dispersant, a weighting agent, a defoamer, a fluid loss agent, a thickening agent, bentonite, a lubricant, a filler, an emulsifier, a surfactant, or a pH buffer;
forming a filter cake adjacent the subsurface formation from the drilling fluid, the filter cake comprising the breaker composite;
performing a wellbore operation; and
reacting the released breaker with a calcium salt in the filter cake thereby removing the filter cake.

* * * * *